(12) United States Patent
Chen et al.

(10) Patent No.: US 10,892,794 B1
(45) Date of Patent: Jan. 12, 2021

(54) MULTI-CHANNEL TRANSMISSION DEVICE

(71) Applicants: Global Unichip Corporation, Hsinchu (TW); Taiwan Semiconductor Manufacturing Co., Ltd., Hsinchu (TW)

(72) Inventors: Yen-Chung T. Chen, Hsinchu (TW); Chia-Hsiang Chang, Hsinchu (TW); Wen-Lung Tu, Hsinchu (TW)

(73) Assignees: Global Unichip Corporation, Hsinchu (TW); Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 16/784,196

(22) Filed: Feb. 6, 2020

(51) Int. Cl.
*H04B 1/00* (2006.01)
*H04B 1/7097* (2011.01)

(52) U.S. Cl.
CPC .................................. *H04B 1/7097* (2013.01)

(58) Field of Classification Search
CPC .......... H04B 1/02; H04B 1/38; H04B 1/7075; H04B 1/713; H04B 2201/7073; H04B 1/7097; H04B 1/69; H04B 1/707; H04B 15/06
USPC .......................... 375/130–140, 147, 149, 222
See application file for complete search history.

(56) References Cited

U.S. PATENT DOCUMENTS

| | | | | |
|---|---|---|---|---|
| 8,270,553 | B2 * | 9/2012 | Ogasawara | H03L 7/197 375/376 |
| 9,312,910 | B1 * | 4/2016 | Chen | H04B 15/00 |
| 9,432,079 | B1 * | 8/2016 | Kumar | H04B 1/713 |
| 10,256,968 | B1 * | 4/2019 | Wu | H03L 7/0814 |
| 2003/0081653 | A1 * | 5/2003 | Hardin | H03L 7/23 375/130 |
| 2007/0041486 | A1 * | 2/2007 | Shin | H03L 7/0996 375/376 |
| 2007/0189360 | A1 * | 8/2007 | Mobin | H04B 1/7075 375/130 |
| 2010/0027586 | A1 * | 2/2010 | Ogasawara | H03L 7/0998 375/130 |
| 2011/0037505 | A1 * | 2/2011 | Kawamoto | H03L 7/0807 327/159 |
| 2011/0068836 | A1 * | 3/2011 | Wang | H03L 7/0807 327/141 |
| 2011/0103427 | A1 * | 5/2011 | Bafra | H03L 7/197 375/130 |
| 2012/0287967 | A1 * | 11/2012 | Ogasawara | H03L 7/0998 375/146 |
| 2013/0094539 | A1 * | 4/2013 | Nakadaira | H03L 7/085 375/147 |

(Continued)

*Primary Examiner* — Emmanuel Bayard
(74) *Attorney, Agent, or Firm* — JCIPRNET

(57) ABSTRACT

A multi-channel transmission device is provided. The multi-channel transmission device includes a clock generator and a plurality of transmitters. The clock generator generates input clocks. The transmitters operate based on spread spectrum clocks respectively. Each of the transmitters comprises a phase rotator. The phase rotator provides a selection signal and an interpolation signal of multiple bits. The phase rotator selects two of the input clocks as a first selected input clock and a second selected input clock according to the selection signal, and generate a spread spectrum clock according to the interpolation signal, the first selected input clock and the second selected input clock.

11 Claims, 4 Drawing Sheets

(56) References Cited

U.S. PATENT DOCUMENTS

| | | | |
|---|---|---|---|
| 2013/0294490 A1* | 11/2013 | Chandrasekaran | H04L 1/205 375/226 |
| 2015/0346744 A1* | 12/2015 | Tan | G05F 1/463 327/513 |
| 2016/0248431 A1* | 8/2016 | Luo | H03L 7/1976 |
| 2016/0351108 A1* | 12/2016 | Suzuki | G09G 3/2092 |
| 2017/0234979 A1* | 8/2017 | Mathews | G01S 19/11 342/357.64 |

* cited by examiner

MULTI-CHANNEL TRANSMISSION DEVICE

BACKGROUND

Technical Field

The present invention generally relates to a transmission device. Particularly, the invention relates to a multi-channel transmission device with low electromagnetic interference (EMI).

Description of Related Art

Generally, a transmission device performs data transmission based on a clock. In some case about the transmission device has a plurality of transmitters, such as tens of transmitters or hundreds of transmitters. When multiple transmitters perform data-transmission based on the same clock, the power radiation of electromagnetic interference (EMI) caused by a synchronous operation of the transmitters may be summed-up. The amount of power radiation from EMI is positively related to the number of transmitters. Therefore, when the transmitters perform data transmission based on the same timing of clocks, a power radiation of EMI may be higher than the Federal Communications Commission (FCC) regulation.

Therefore, how to reduce the power radiation of EMI of transmission device having the plurality of transmitters is now an important subject to work on in the technologies.

SUMMARY

The present invention is directed to a multi-channel transmission device with low electromagnetic interference (EMI).

The invention provides a multi-channel transmission device. The multi-channel transmission device includes a clock generator and a plurality of transmitters. The clock generator is configurated to generate a plurality of input clocks. The transmitters are coupled to the clock generator, and configurated to operate based on a spread spectrum clock respectively. Each of the plurality of transmitters comprises a phase rotator. The phase rotator is configurated to provide a selection signal and an interpolation signal of multiple bits. The phase rotator selects two of the plurality of input clocks as a first selected input clock and a second selected input clock according to the selection signal, and generate a spread spectrum clock according to the interpolation signal, the first selected input clock and the second selected input clock. A frequency offset ranges of a plurality of spread spectrum clocks generated by the plurality of transmitters are not completely the same as each other.

Accordingly, the transmitters provide spread spectrum clocks respectively. Additionally, the frequency offset ranges of the spread spectrum clocks generated by the transmitters are not completely the same as each other. The transmitters do not perform data transmission synchronously. Therefore, a power radiation of EMI of multi-channel transmission device is lower than the Federal Communications Commission (FCC) regulation.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the invention.

DESCRIPTION OF THE EMBODIMENTS

Figure 1:
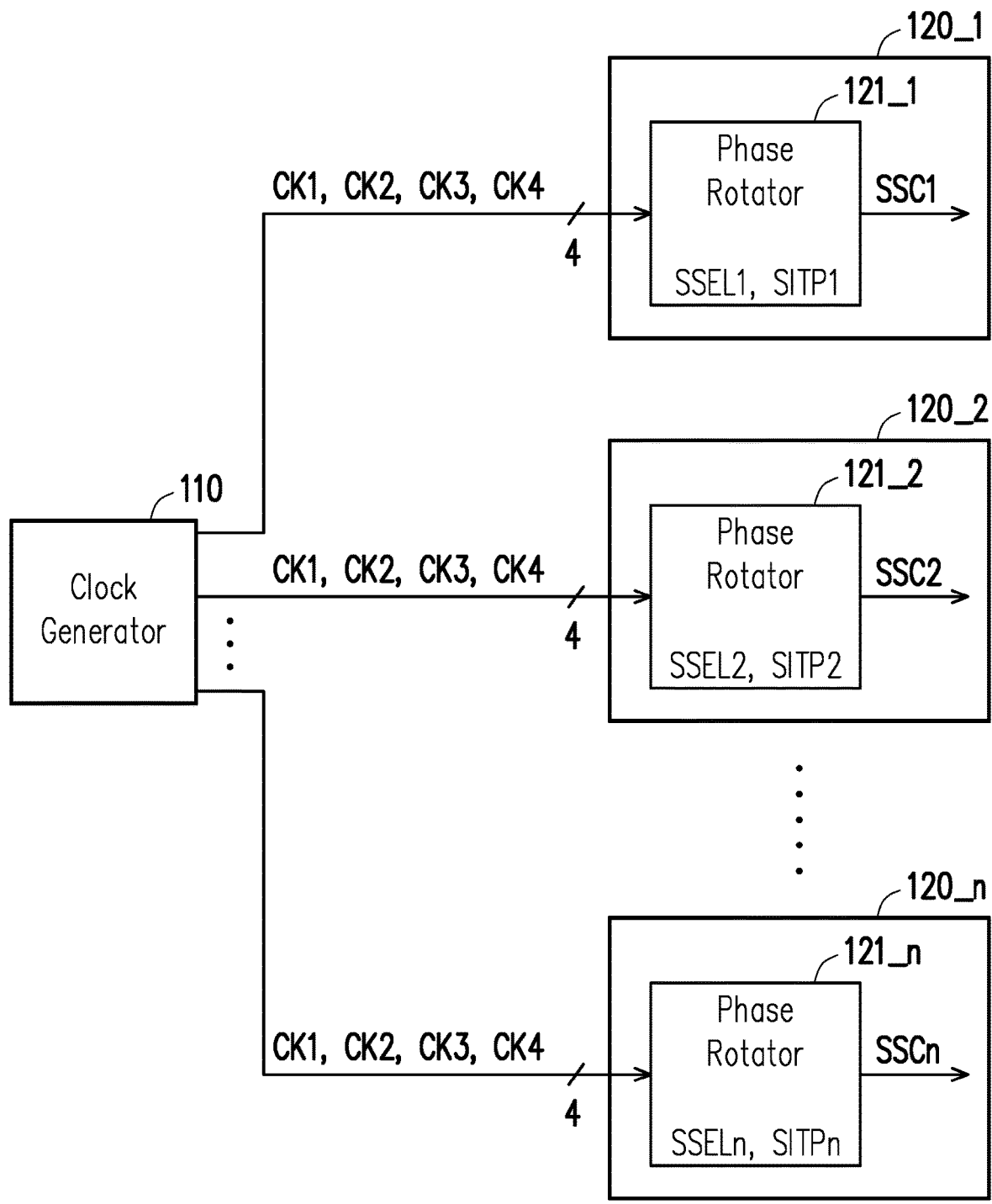
FIG. 1 illustrates a block diagram of a multi-channel transmission device according to an embodiment of the invention.

In order to make the invention more comprehensible, embodiments are described below as examples showing that the disclosure can actually be realized. The embodiments provided herein are only for an illustrative purpose, instead of limiting the scope of the invention. Moreover, wherever possible, the same reference numbers are used in the drawings and the description of embodiments to refer to the same or like parts.

Referring to FIG. 1, FIG. 1 illustrates a block diagram of a multi-channel transmission device according to an embodiment of the invention. In the embodiment, the multi-channel transmission device 100 includes a clock generator 110 and transmitters 120_1, 120_2, . . . , and 120_*n*. In the embodiment, the clock generator 110 may be implemented by a phase-locked loop (PLL) circuit. The clock generator 110 generates input clocks CK1, CK2, CK3 and CK4. The transmitters 120_1, 120_2, . . . , and 120_*n* are coupled to the clock generator 110. The transmitters 120_1, 120_2, . . . , and 120_*n* operates based on spread spectrum clocks SSC1, SSC2, . . . , and SSCn respectively. For example, the transmitter 120_1 operates based on spread spectrum clock SSC1. The transmitter 120_2 operates based on spread spectrum clock SSC2, and so on. In the embodiment, the clock generator 110 generates four input clocks (input clocks CK1, CK2, CK3 and CK4). In some embodiments, the number of input clocks may be more than four. The number of input clocks of the invention is not limited to the embodiment.

In the embodiment, each of the transmitters 120_1, 120_2, . . . , and 120_*n* includes a phase rotator. In the embodiment, the transmitters 120_1 includes a phase rotator 121_1. The transmitter 120_2 includes a phase rotator 121_2, and so on. For example, about the phase rotator 121_1, the phase rotator 121_1 provides a selection signal SSEL1 and an interpolation signal SITP1 of multiple bits. The phase rotator 121_1 select two of input clocks CK1, CK2, CK3 and CK4 as a first selected input clock and a second selected input clock according to the selection signal SSEL1. The phase rotator 121_1 generates a spread spectrum clock SSC1 according to the interpolation signal SITP1, the first selected input clock and the second selected input clock. In the embodiment, a frequency offset ranges of the spread spectrum clocks SSC1, SSC2, . . . , and SSCn generated by the transmitters 120_1, 120_2, . . . , and 120_*n* are not completely the same as each other. In some embodiment, a frequency offset ranges of the spread spectrum clocks SSC1, SSC2, . . . , and SSCn generated by the transmitters 120_1, 120_2, . . . , and 120_*n* are different from each other. Therefore, the transmitters 120_1, 120_2, . . . , and 120_*n* do not perform data transmission synchronously, so as to cause a power radiation of EMI of the multi-channel transmission device 100 is lower than the Federal Communications Commission (FCC) regulation.

Figure 2:
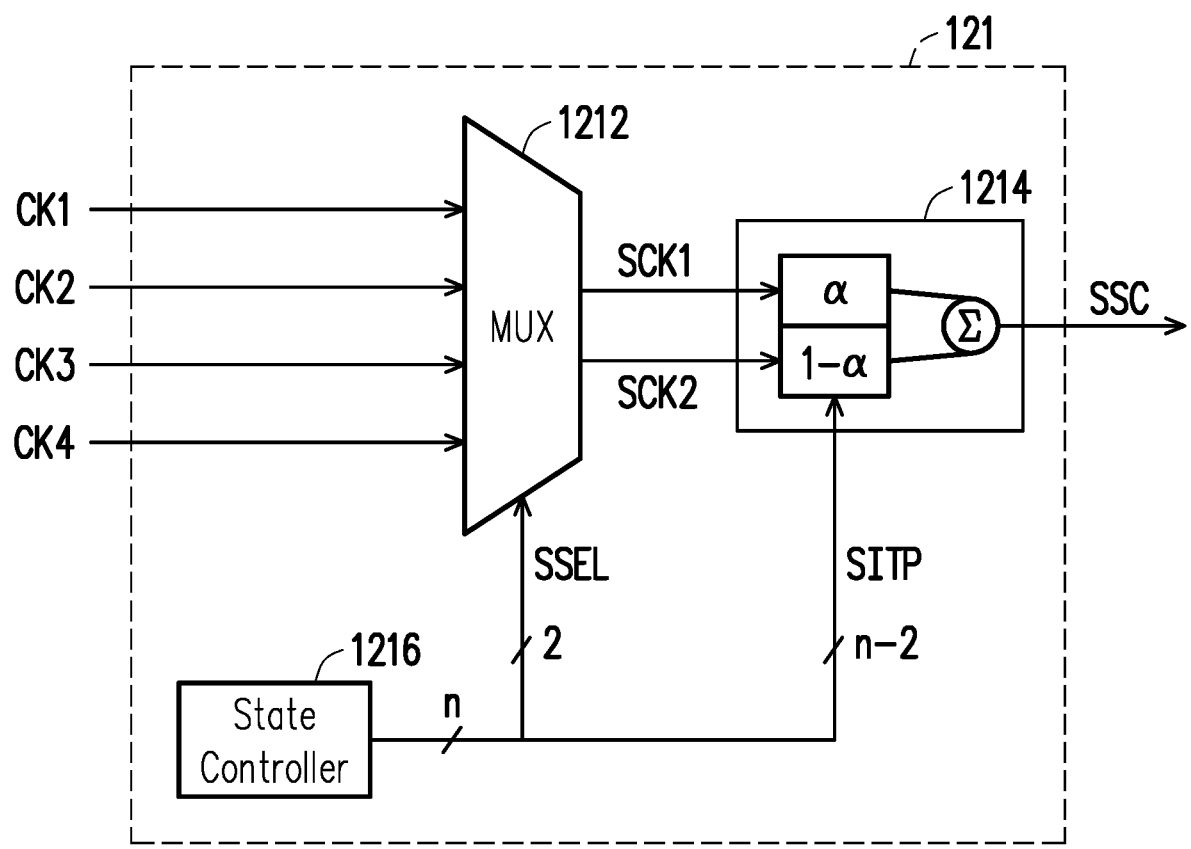
FIG. 2 illustrates a block diagram of a phase rotator according to an embodiment of the invention.

Referring to FIG. 2, FIG. 2 illustrates a block diagram of a phase rotator according to an embodiment of the invention. In the embodiment, the phase rotator 121 is applicable to at least one of the phase rotators 121_1, 121_2, ..., and 121_n in FIG. 1. The phase rotator 121 includes a multiplexer (MUX) 1212, a phase interpolator 1214 and a state controller 1216. The multiplexer 1212 receives the plurality of input clocks CK1, CK2, CK3 and CK4. The multiplexer 1212 sequentially provides two of the input clocks CK1, CK2, CK3 and CK4 as the first selected input clock SCK1 and the second selected input clock SCK2 according to the selection signal SSEL. For example, the multiplexer 1212 provides the input clock CK1 as the first selected input clock SCK1, and provides the input clock CK2 as the second selected input clock SCK2 according to the selection signal SSEL at a first-time interval. The multiplexer 1212 provides the input clock CK2 as the first selected input clock SCK1, and provides the input clock CK3 as the second selected input clock SCK2 according to the selection signal SSEL at a second-time interval after the first-time interval, and so on. In the embodiment, the timing of input clocks CK1, CK2, CK3 and CK4 are different from each other. In the embodiment, the timing of input clock CK1 leads the timing of input clock CK2 90°. The timing of input clock CK2 leads the timing of input clock CK3 90°, and so on. Therefore, a phase difference between the first selected input clock SCK1 and the second selected input clock SCK2 is equal to 90° substantially.

In some embodiments, the number of the input clocks may be great than 4. For example, the number of the input clocks is 5, so the timing of input clock CK1 may lead the timing of input clock CK2 72°. The timing of input clock CK2 may lead the timing of input clock CK3 72°, and so on. Therefore, the phase difference between the first selected input clock SCK1 and the second selected input clock SCK2 may be 72°.

In the embodiment, the phase interpolator 1214 is coupled to the multiplexer 1212. The phase interpolator 1214 receives the interpolation signal SITP, the first selected input clock SCK1 and the second selected input clock SCK2. The phase interpolator 1214 generates the spread spectrum clock SSC according to the interpolation signal SITP, the first selected input clock SCK1 and the second selected input clock SCK2. Further, the phase interpolator 1214 adjusts the phase of the spread spectrum clock SSC by changing the interpolation signal SITP.

In the embodiment, the state controller 1216 provides the selection signal SSEL to the multiplexer 1212 and provides the interpolation signal SITP to the phase interpolator 1214. In the embodiment, the state controller is implemented by a finite state machine (FSM). the state controller 1216 may provide a time-varying selection signal stream about variations of the selection signal SSEL to the multiplexer 1212 and provide a time-varying interpolation signal stream about variations of the interpolation signal SITP to the phase interpolator 1214.

In detail, the selection signal SSEL is a 2-bits signal. The interpolation signal SITP is a (n−2)-bits signal. The number n may be from 5 to 7. The number n of the invention is not limited to this embodiment. In other words, the selection signal has $2^2$ variations. The interpolation signal SITP has $2^3$ to $2^5$ variations. For example, the state controller 1216 may arrange the $2^2$ variations of the selection signal SSEL to provide the time-varying selection signal stream. The state controller 1216 may arrange the $2^5$ variations of the interpolation signal SITP to provide the time-varying interpolation signal stream.

Figure 3:
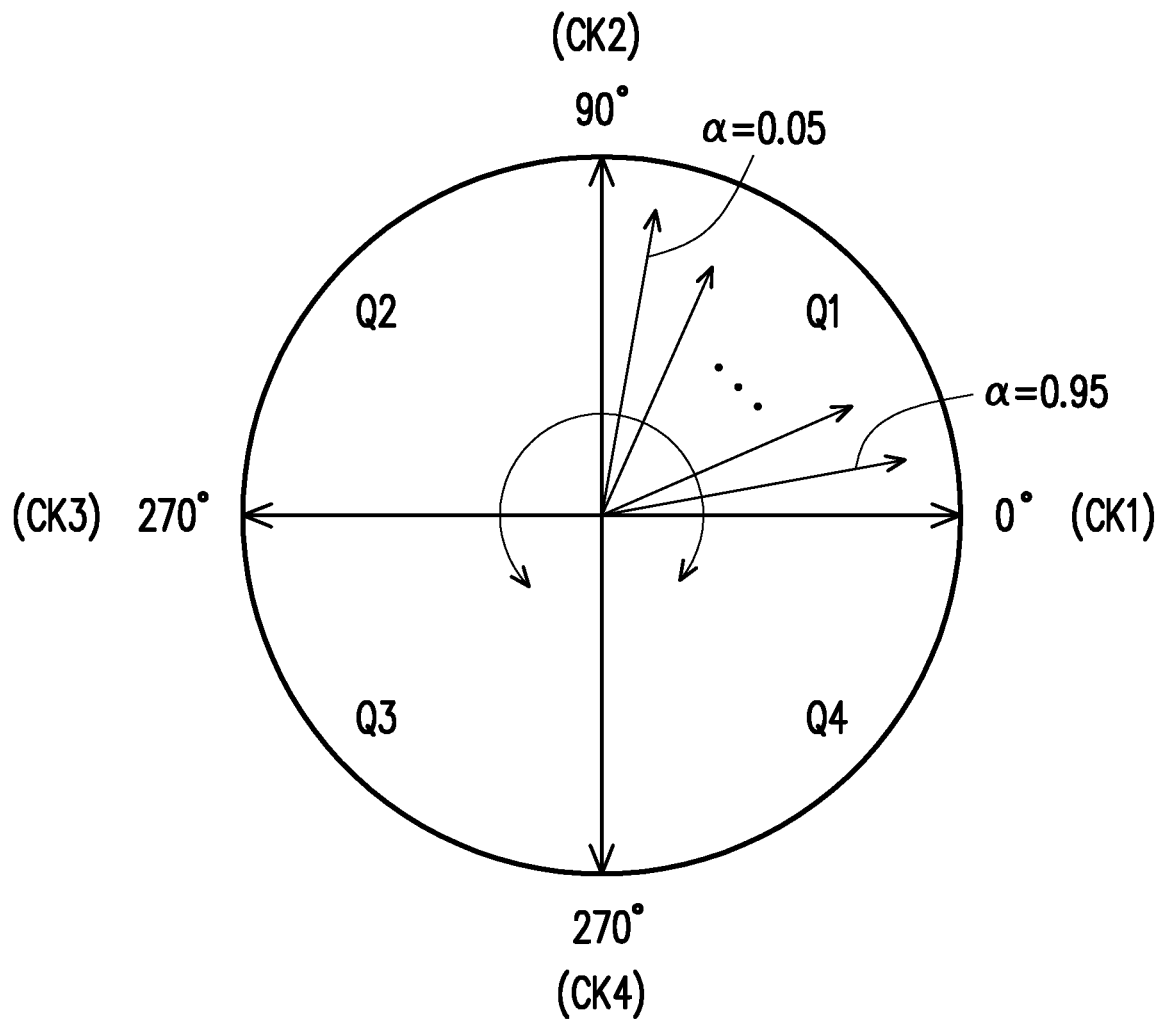
FIG. 3 illustrates a diagram of a phase offset according to an embodiment of the invention.

In order to further explain, referring to FIGS. 2 and 3, FIG. 3 illustrates a diagram of a phase offset according to an embodiment of the invention. In the embodiment, a first quadrant Q1, a second quadrant Q2, a third quadrant Q3 and a fourth quadrant Q4 are selected by the multiplexer 1212 according to the selection signal SSEL. The first quadrant Q1 in FIG. 3 is a phase quadrant defined by input clocks CK1 and CK2. The second quadrant Q2 in FIG. 3 is a phase quadrant defined by input clocks CK2 and CK3. The third quadrant Q3 in FIG. 3 is a phase quadrant defined by input clocks CK3 and CK4. The fourth quadrant Q4 in FIG. 3 is a phase quadrant defined by input clocks CK4 and CK1. In the embodiment, a counterclockwise rotation of quadrants Q1, Q2, Q3 and Q4 controlled by the multiplexer 1212 based on a time-varying selection signal stream may reduce a frequency of the spread spectrum clock SSC. On the other hand, clockwise rotation of the quadrants Q1, Q2, Q3 and Q4 controlled by the multiplexer 1212 based on another time-varying selection signal stream may increase the frequency of the spread spectrum clock SSC.

In the embodiment, the multiplexer 1212 provides the input clock CK1 as the first selected input clock SCK1, and provides the input clock CK2 as the second selected input clock SCK2 according to the selection signal SSEL. The first quadrant Q1 is selected. In the first quadrant Q1, the phase interpolator 1214 performs interpolation process to first selected input clock SCK1 and the second selected input clock SCK2 to generate the spread spectrum clock SSC according to the interpolation signal SITP. The phase interpolator 1214 adjusts the phase of the spread spectrum clock SSC by changing the interpolation signal SITP.

For example, the phase interpolator 1214 provides a constant α according to the interpolation signal SITP. The constant α is less than 1 and large than 0. At a first time point, the phase interpolator 1214 provides a constant α=0.95 according to a first digital code value of the interpolation signal SITP. The spread spectrum clock SSC is generated and a phase of the spread spectrum clock SSC slightly behinds a phase of input clock CK1. At a second time point, the phase interpolator 1214 provides a constant α=0.05 according to a second digital code value of the interpolation signal SITP at a second time point. The spread spectrum clock SSC is generated and a phase of the spread spectrum clock SSC slightly leads a phase of input clock CK2. In other words, the constant α is used to decide a transition point (rising edge and/or falling edge) of the spread spectrum clock SSC. In the embodiment, the frequency of the spread spectrum clock SSC may be decreased with decreasing the constant α. In other words, the phase interpolator 1214 generates the spread spectrum clock SSC according to the interpolation signal SITP and adjusts the frequency of spread spectrum clock SSC according to the interpolation signal stream (different interpolation signals SITP).

Based on the teachings above, the phase rotator 121 may generate a different spread spectrum clock SSC by changing the time-varying selection signal stream and the time-varying interpolation signal stream from the state controller 1216.

Figure 4:
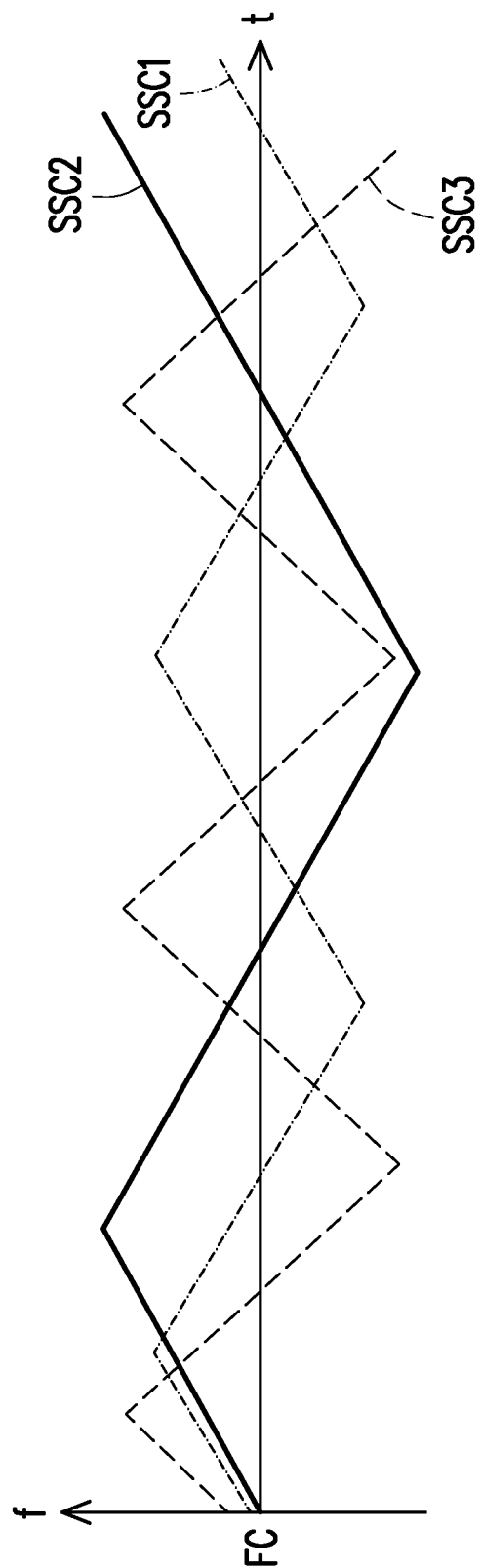
FIG. 4 illustrates a timing diagram of spread spectrum clocks according to an embodiment of the invention.

Referring to FIGS. 1 and 4, FIG. 4 illustrates a timing diagram of spread spectrum clocks according to an embodiment of the invention. In the embodiment, state controllers of transmitters 120_1, 120_2, . . . , and 120_n are not completely the same as each other. For example, a number of bits of an interpolation signal SITP provided by the state controller of the transmitter 120_1 is different from a number of bits of an interpolation signal SITP provided by a state controller of the transmitter 120_2. For example, a time-varying selection signal stream provided by the state controller of the transmitters 120_1 is different from a time-varying selection signal stream provided by a state controller of the transmitter 120_n. For example, a time-varying interpolation signal stream provided by the state controller of the transmitter 120_2 is different from a time-varying interpolation signal stream provided by a state controller of the transmitter 120_n. In some embodiment, the state controllers of transmitters 120_1, 120_2, . . . , and 120_n are different from each other.

In the embodiment, because that the time-varying selection signal streams and the time-varying interpolation signal streams the state controllers of transmitters 120_1, 120_2, . . . , and 120_n are not completely the same as each other, spread spectrum clocks SSC1, SSC2, . . . , and SSCn are not completely the same as each other. For example, a frequency FC is the frequency of the input clocks CK1, CK2, CK3 and CK4. The frequency FC may be 1 GHz. A frequency offset range of the spread spectrum clock SSC1 is 50 parts per million (ppm). A spread spectrum period of the spread spectrum clock SSC1 is 2.5 micro second. A frequency offset range of the spread spectrum clock SSC2 is 75 ppm. A spread spectrum period of the spread spectrum clock SSC2 is 4 micro second. A frequency offset range of the spread spectrum clock SSC3 is 65 ppm. A spread spectrum period of the spread spectrum clock SSC3 is 1.82 micro second. Therefore, the transmitters 120_1, 120_2, . . . , and 120_n do not perform data transmission synchronously. The power radiation of EMI of multi-channel transmission device is lower than the FCC regulation.

In summary, the transmitters of the multi-channel transmission device provide spread spectrum clocks respectively. The frequency offset ranges of the spread spectrum clocks generated by the transmitters are not completely the same as each other. The transmitters do not perform data transmission synchronously. Therefore, the power radiation of EMI of multi-channel transmission device is lower than the FCC regulation.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A multi-channel transmission device, comprising:
   a clock generator, configured to generate a plurality of input clocks; and
   a plurality of transmitters, coupled to the clock generator, and configured to operate based on a spread spectrum clock respectively, wherein each of the plurality of transmitters comprises:
      a phase rotator, configured to provide a selection signal and an interpolation signal of multiple bits, select two of the plurality of input clocks as a first selected input clock and a second selected input clock according to the selection signal, and generate a spread spectrum clock according to the interpolation signal, the first selected input clock and the second selected input clock,
      wherein frequency offset ranges and spread spectrum periods of a plurality of spread spectrum clocks are different from each other, wherein the spread spectrum periods are change periods of frequency offsets of the spread spectrum clocks respectively.

2. The multi-channel transmission device according to claim 1, wherein a phase difference between the first selected input clock and the second selected input clock is less than or equal to 90°.

3. The multi-channel transmission device according to claim 1, wherein the clock generator is implemented by a phase-locked loop circuit.

4. The multi-channel transmission device according to claim 1, wherein the phase rotator comprises:
   a state controller, configured to provide the selection signal and the interpolation signal.

5. The multi-channel transmission device according to claim 4, wherein the state controller is implemented by a finite state machine.

6. The multi-channel transmission device according to claim 1, wherein a number of bits of a first interpolation signal provided by a first state controller of a first transmitter of the plurality of transmitters is different from a number of bits of a second interpolation signal provided by a second state controller of a second transmitter of the plurality of transmitters.

7. The multi-channel transmission device according to claim 1, wherein the state controller combines a plurality of variations of the selection signal to provide a time-varying selection signal stream, and combines a plurality of variations of the interpolation signal to provide a time-varying interpolation signal stream, wherein the phase rotator generates a different spread spectrum clock by changing the time-varying selection signal stream and the time-varying interpolation signal stream.

8. The multi-channel transmission device according to claim 7, wherein a time-varying selection signal stream provided by a first state controller of a first transmitter of the plurality of transmitters is different from a time-varying selection signal stream provided by a second state controller of a second transmitter of the plurality of transmitters.

9. The multi-channel transmission device according to claim 7, wherein a time-varying interpolation signal stream provided by a first state controller of a first transmitter of the plurality of transmitters is different from a time-varying interpolation signal stream provided by a second state controller of a second transmitter of the plurality of transmitters.

10. The multi-channel transmission device according to claim 1, wherein the phase rotator comprises:
    a multiplexer, configured to receive the plurality of input clocks, and sequentially provide two of the input clocks as the first selected input clock and the second selected input clock according to the selection signal.

11. The multi-channel transmission device according to claim 10, wherein the phase rotator further comprises:
    a phase interpolator, coupled to the multiplexer, configured to receive the interpolation signal, the first selected input clock and the second selected input clock, generate the spread spectrum clock according to the interpolation signal the first selected input clock and the second selected input clock, and adjust the phase of the spread spectrum clock by changing the interpolation signal.

\* \* \* \* \*